No. 818,792. PATENTED APR. 24, 1906.
T. SCHMEISER.
CHECK BACK ATTACHMENT AND CLAMP FOR TEAMS.
APPLICATION FILED SEPT. 2, 1905.

Witnesses. Inventor:
Theodore Schmeiser
By Geo. H. Strong. Atty.

UNITED STATES PATENT OFFICE.

THEODORE SCHMEISER, OF DAVISVILLE, CALIFORNIA.

CHECK-BACK ATTACHMENT AND CLAMP FOR TEAMS.

No. 818,792.            Specification of Letters Patent.            Patented April 24, 1906.

Application filed September 2, 1905. Serial No. 276,819.

*To all whom it may concern:*

Be it known that I, THEODORE SCHMEISER, a citizen of the United States, residing at Davisville, in the county of Yolo and State of California, have invented new and useful Improvements in Check-Back Attachments and Clamps for Teams, of which the following is a specification.

My invention relates to a device which is designed for attachment for teams of horses for the purpose of checking such horses in teams as are inclined to travel too freely and to thus equalize the pull of the entire team.

It consists of a clamp and means for connecting the reins therewith and in details of construction, which will be more fully explained by reference to the accompanying drawings, in which—

Figure 1:
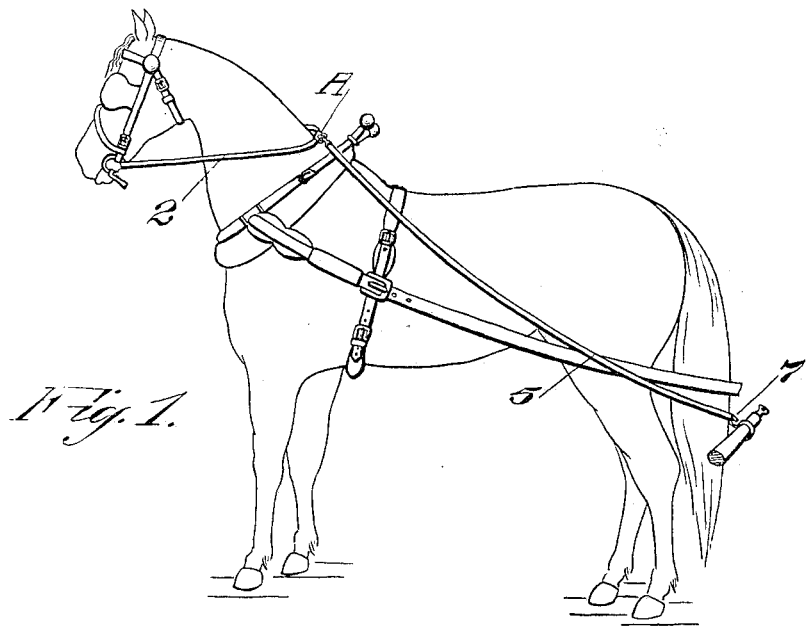
Figures 2, 4:
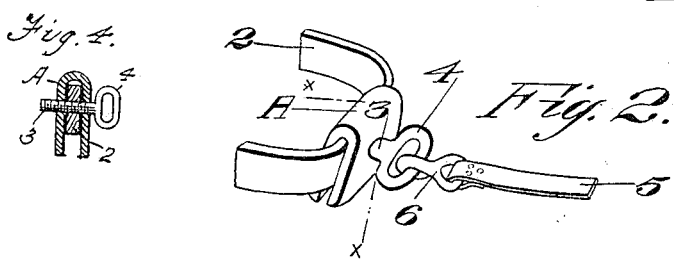
Figure 3:
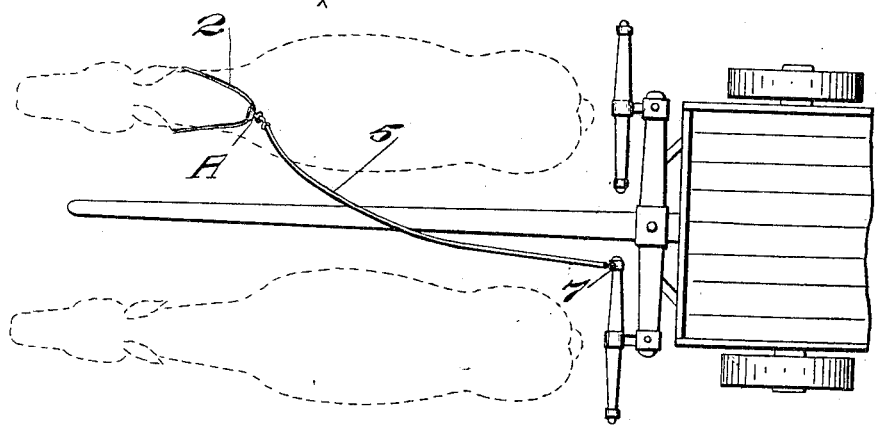

Figure 1 is a view of my clamp and its connection. Fig. 2 shows its attachment to a checkrein enlarged. Fig. 3 is a view showing its attachment in connection with a team. Fig. 4 is a sectional view of the clamp on the line $x\,x$ of Fig. 2.

In the hauling of combined harvesters, gang-plows, and other agricultural or similar machinery it is customary to employ teams of as high as twenty-four to thirty-two horses and to so connect equalizing-bars and apparatus to which said teams are attached in parallel series of four, six, or more that the pull of the whole team is concentrated upon the work to be done and irregularities in pull are counterbalanced. In such teams there is a great variety in the action of the animals thus harnessed, and some of the horses will surge ahead of others in their series and will interfere with the evenness of the pull of the whole team. Some of the horses are also inclined to pull to one side or the other, and it is customary to employ certain two-part reins, which are connected together and attached to some fixed point in the draft apparatus to steady such animals. Reins of this kind are more or less expensive, because they take a considerable quantity of fine leather to make them up, which parts are not required in an ordinary harness. My invention is designed to utilize the checkrein of an ordinary harness in connection with a reduced portion of strap or line which is intended for the check or what is technically known as "buck-back line."

As shown in the drawings, A is a U-shaped clamp having a space between the legs of the U of sufficient size to fit over a checkrein 2, as shown. Through the sides of these legs passes a screw-shank, as at 3, which is threaded into these sides, so that it may be screwed in tight. The outer end of this shank has an open loop 4 of suitable form. The clamp is fitted over the bight of the checkrein at such point as to hold the horse's head practically straight or in a desired position, and the screw is passed through the checkrein and screwed up tight, thus holding the clamp in the desired position.

5 is what is known as the "buck-back line," and this may have a snap-hook or other attachment, as at 6, so that it can be readily connected with or disconnected from the loop of the clamp. This line extends back and attaches to some point on the draft apparatus. As herein shown, it connects with one of the whiffletree or evener bars, as at 7. By this arrangement it is only necessary to provide that portion of the line extending from the clamp back to the point of attachment, and I am enabled to save the two-part rein which would ordinarily extend from the end line to the bits.

The operation would then be as follows: The clamp fixed to the checkrein may be connected with relation to the check-hook or hames so that the horse cannot turn his head to one side or the other if he is inclined to pull to one side, and the buck-back line attached as it is prevents a spirited horse from surging ahead and temporarily pulling more than his mates in the team.

Having thus described my invention, what I claim, and desire to secure by Letters Patent, is—

1. A checking and restraining device for horses, said device consisting of the combination of a checkrein and a clamp adjustably fixed thereto and having a loop or attachment, and a line connecting with said clamp and extending diagonally rearward and connected to a portion of the draft apparatus.

2. A check and restraining device for horses, said device consisting of the combination with a checkrein of a U-shaped clamp adapted to fit and inclose the bight of the checkrein, a screw-shank passing through the sides of the clamp and the rein, said screw having an open loop or head, a single rein having one end attached to said loop and the other extending diagonally rearward and connected to a portion of the draft apparatus.

In testimony whereof I have hereunto set my hand in presence of two subscribing witnesses.

THEODORE SCHMEISER.

Witnesses:
C. S. HOPKINS,
E. D. A. LIKE.